// 
US011018557B2

(12) United States Patent
Nagamatsu (10) Patent No.: US 11,018,557 B2
(45) Date of Patent: May 25, 2021

(54) SPEED DETECTION APPARATUS OF ROTATIONAL SHAFT IN ROBOT ARM

(71) Applicant: DENSO WAVE INCORPORATED, Aichi-pref. (JP)

(72) Inventor: Kenji Nagamatsu, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 107 days.

(21) Appl. No.: 16/255,485

(22) Filed: Jan. 23, 2019

(65) Prior Publication Data
US 2019/0260273 A1      Aug. 22, 2019

(30) Foreign Application Priority Data

Feb. 22, 2018  (JP) .............................. JP2018-029681

(51) Int. Cl.
| | | |
|---|---|---|
| *H02K 11/215* | (2016.01) | |
| *G01D 5/14* | (2006.01) | |
| *H02K 11/33* | (2016.01) | |
| *B25J 9/16* | (2006.01) | |
| *B25J 13/08* | (2006.01) | |
| *H02K 7/00* | (2006.01) | |
| *B25J 18/00* | (2006.01) | |

(52) U.S. Cl.
CPC .......... *H02K 11/215* (2016.01); *B25J 9/1651* (2013.01); *B25J 13/088* (2013.01); *G01D 5/145* (2013.01); *H02K 7/003* (2013.01); *H02K 11/33* (2016.01); *B25J 18/00* (2013.01)

(58) Field of Classification Search
CPC ........... B25J 19/00; G01D 5/04; H02K 11/00; H02K 7/116
See application file for complete search history.

(56) References Cited

U.S. PATENT DOCUMENTS

| | | | | |
|---|---|---|---|---|
| 5,990,651 A | * | 11/1999 | Iwazawa | .................... H02P 8/14 |
| | | | | 318/560 |
| 9,140,581 B2 | * | 9/2015 | Shimada | .............. G01D 5/2451 |
| 2015/0142377 A1 | * | 5/2015 | Kishida | ..................... G01B 7/30 |
| | | | | 702/151 |
| 2017/0001304 A1 | | 1/2017 | Kato | |
| 2018/0361592 A1 | * | 12/2018 | Motoyoshi | ........... B25J 17/0275 |

FOREIGN PATENT DOCUMENTS

JP           2015-142948 A      8/2015

* cited by examiner

*Primary Examiner* — Said Bouziane
(74) *Attorney, Agent, or Firm* — Oliff PLC (57) ABSTRACT

An speed detection apparatus of a rotational shaft in a robot arm that is applied to a drive mechanism is provided. The speed detection apparatus includes: first and second rotation sensors that are disposed on a side of a rotational shaft of the robot arm and outputs first and second rotational position signals with a phase difference of 90 degrees; first and second differentiators that differentiate the first and second rotational position signals; and a speed calculator that obtains a rotational speed of the robot arm by calculating a sum of squares of a first differential signal and a second differential signal.

5 Claims, 9 Drawing Sheets

SPEED DETECTION APPARATUS OF ROTATIONAL SHAFT IN ROBOT ARM

CROSS REFERENCE TO RELATED APPLICATION

This application is based on Japanese Patent Application No. 2018-029681 filed on Feb. 22, 2018, the disclosure of which is incorporated herein by reference.

TECHNICAL FIELD

The present disclosure relates to an apparatus for detecting speed of a rotational shaft of a robot arm.

BACKGROUND

A rotation sensor such as a rotary encoder is attached to a motor that drives each shaft of a robot arm. The robot arm is driven via a speed reduction mechanism connected to a rotational shaft of the motor.

SUMMARY

The present disclosure provides an speed detection apparatus of a rotational shaft in a robot arm that is applied to a drive mechanism includes a motor, a speed reduction mechanism connected to a rotational shaft of the motor, and a rotational shaft of the robot arm driven via the speed reduction mechanism. The speed detection apparatus includes: a rotation sensor that is disposed on a side of the rotational shaft of the robot arm and outputs a rotational position signal; a differentiator that differentiates the rotational position signal; and a speed calculator that obtains a rotational speed of the robot arm by calculating a sum of squares of a differential signal output from the differentiator.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

The inventor of the present disclosure has found the following.

Figure 8:
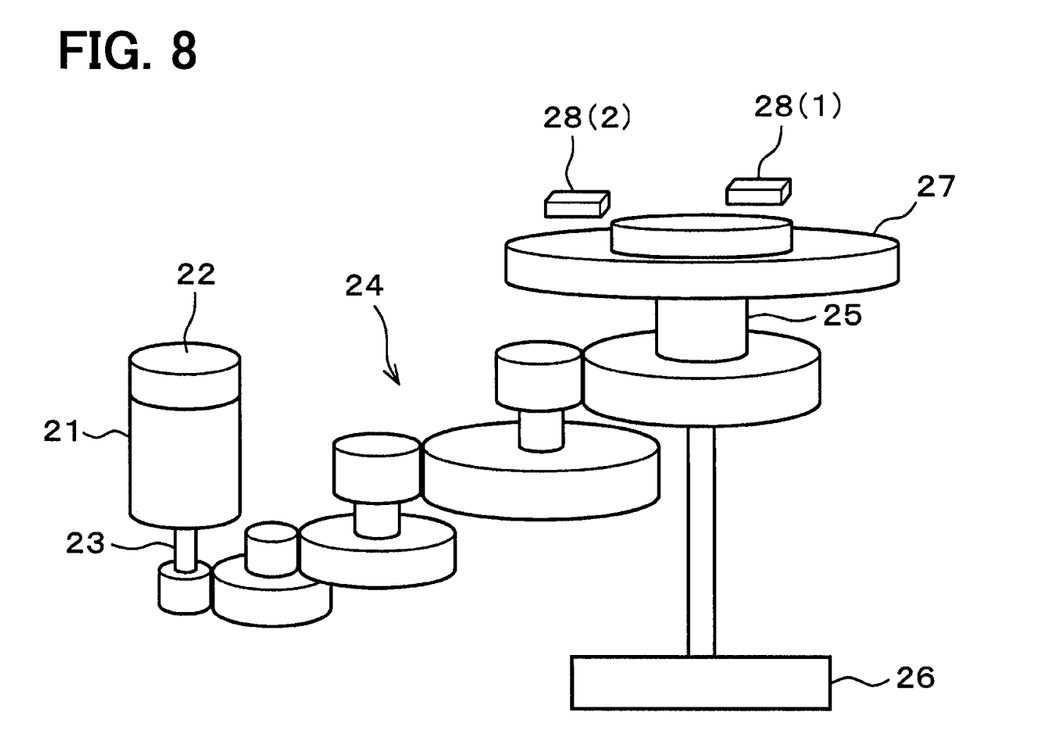
FIG. 8 is diagram illustrating a model of the configuration around each shaft of a robot.

In order to ensure safety when such a robot is operated, for example, a rotation sensor may be provided on a rotational shaft of the arm connected to the speed reduction mechanism, that is, an output side thereof, as illustrated in FIG. 8 to directly detect the operating speed of the arm and stop driving of the motor when the operating speed exceeds an upper limit value.

A Hall sensor may be used as the rotation sensor disposed on the output side as illustrated in FIG. 8, for example. A permanent magnet 27 is disposed on a rotational shaft 25 of the arm, and a magnetic change associated with the rotation of the magnet 27 is detected by a Hall sensor 28. The direction of rotation of the arm can be detected when two Hall sensors 28 (1) and 28 (2) are used to obtain sensor signals with a phase difference of 90 degrees.

Assuming that the rotational speed is obtained from two-phase sensor signals, one signal corresponds to sin θ while the other signal corresponds to cos θ. The speed may be obtained by finding a rotational position θ using the following equation and differentiating the rotational position θ.

$$\theta = \arctan(\sin\theta/\cos\theta) \quad \text{(Equation 1)}$$

Figure 9:
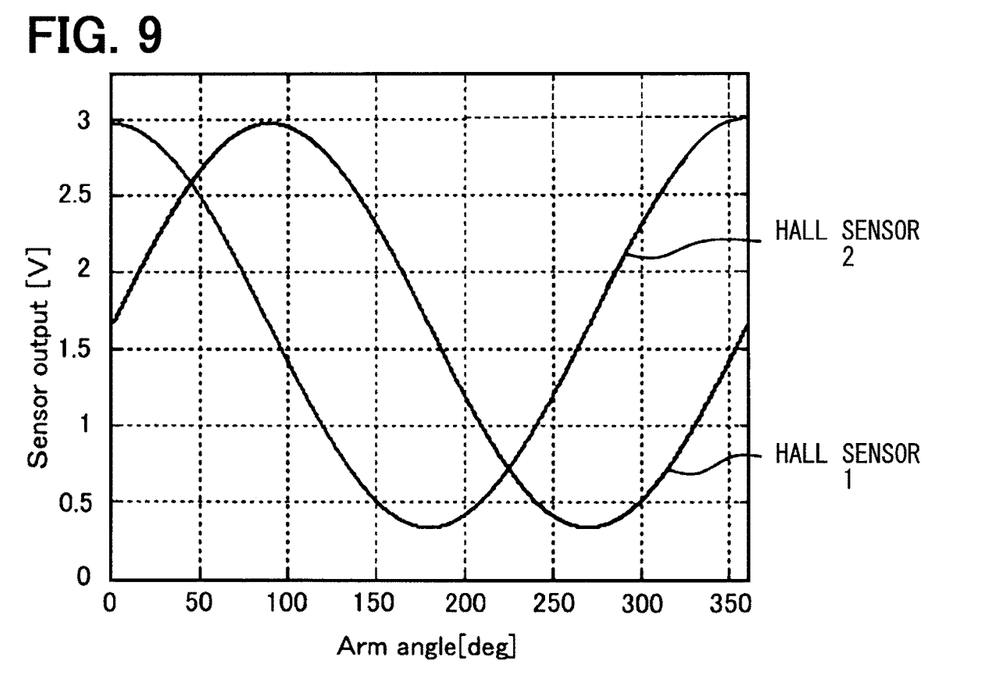
FIG. 9 is a graph illustrating two-phase Hall sensor signals.
Figure 10:
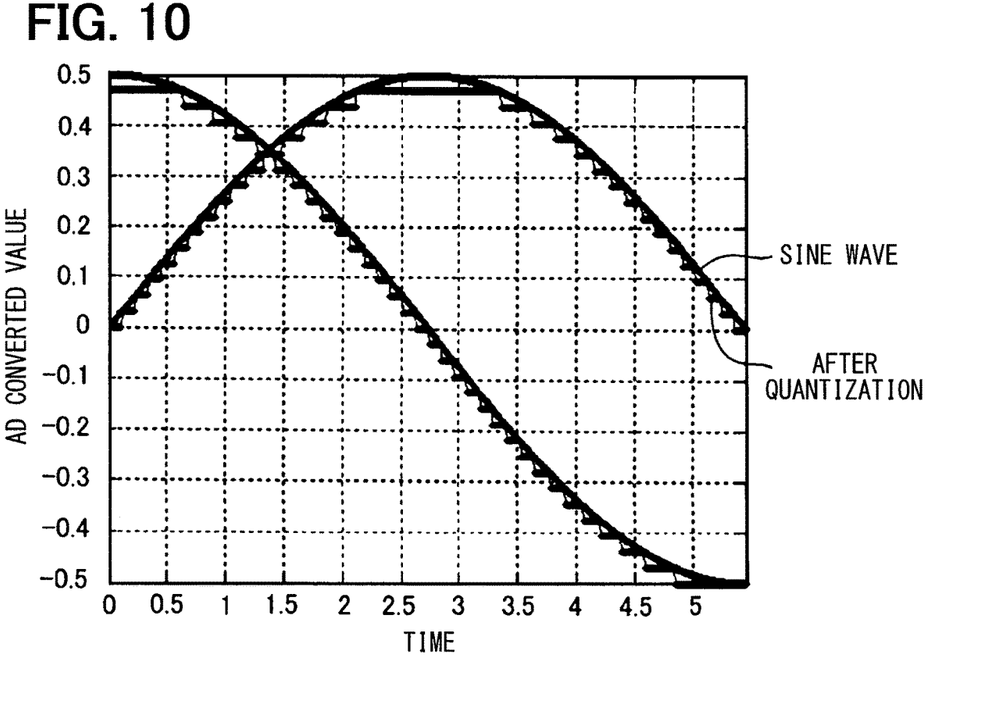
FIG. 10 is a graph illustrating ND converted values of the Hall sensor signals.
Figure 11:
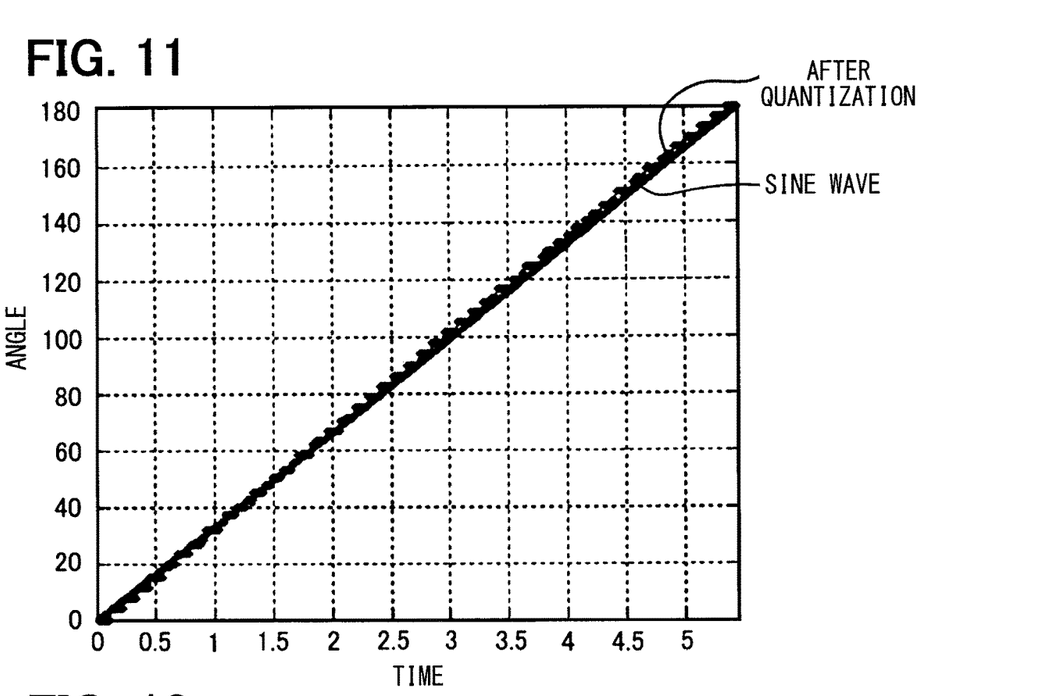
FIG. 11 is a graph illustrating an angle obtained from the Hall sensor signals.
Figure 12:
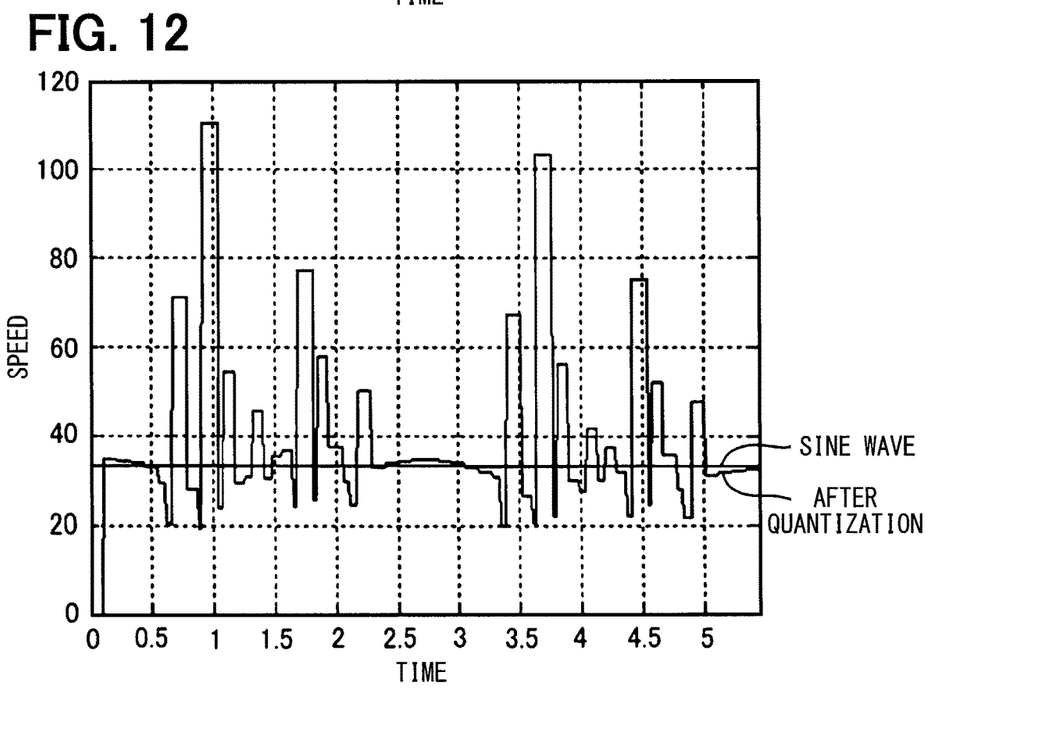
FIG. 12 is a graph illustrating speed of a rotational shaft obtained from the angle.

Information on the rotational position obtained by the Hall sensor may have low resolution. Thus, the rotational speed obtained on the basis of the above equation may have a very large error. For example, A/D conversion of two-phase Hall sensor signals as illustrated in FIG. 9 may result in values including quantization errors as illustrated in FIG. 10. The angle θ obtained from Equation 1 using these values is as illustrated in FIG. 11. The speed obtained by differentiating the angle θ may have very large variations as illustrated in FIG. 12.

An embodiment will be described with reference to FIGS. 1 to 8. As illustrated in FIG. 3, a robot system 1 includes a vertical articulated robot 2 and a controller 3 for controlling the robot 2. The robot system 1 is employed for a general industrial use. The robot 2 includes a structure as a so-called six-axis vertical articulated robot. A shoulder 6 is connected to be able to rotate in a horizontal direction on a base 5 via a first shaft (J1) with its center extending in a Z direction. The shoulder 6 is connected to a lower end of a lower arm 7 via a second shaft (J2) with its center extending in a Y direction, the lower arm extending upward to be able to rotate in a vertical direction. A distal end of the lower arm 7 is connected to a first upper arm 8 via a third shaft (J3) with its center extending in the Y direction, the first upper arm being able to rotate in the vertical direction.

A distal end of the first upper arm 8 is connected to a second upper arm 9 via a fourth shaft (J4) with its center extending in an X direction, the second upper arm being able to perform twist rotation. A distal end of the second upper arm 9 is connected to a wrist 10 via a fifth shaft (J5) with its center extending in the Y direction, the wrist being able to rotate in the vertical direction. The wrist 10 is connected to a flange 11 via a sixth shaft (J6) with its center extending in the X direction, the flange being able to perform twist rotation.

The base 5, the shoulder 6, the lower arm 7, the first upper arm 8, the second upper arm 9, the wrist 10, and the flange 11 function as an arm of the robot 2, and a tool (not shown) for holding a workpiece is attached to the flange 11 at the tip of the arm. The axes (J1 to J6) of the robot 2 are each provided with a motor (not shown) that serves as a driving source.

The controller 3 is a control device of the robot 2, and controls the robot 2 by executing a computer program in control means including a computer with a CPU, a ROM, a RAM, and the like. Specifically, the controller 3 includes a drive portion composed of an inverter circuit or the like and drives each motor by feedback control or the like on the basis of a rotational position of the motor detected by an encoder provided in each motor.

The controller 3 includes a CPU, a ROM, a RAM, a motor driver corresponding to the drive portion, and the like. The ROM stores a system program, an operating program, and the like of the robot 2. The RAM stores parameter values and the like when these programs are executed. A position detection circuit of the controller 3 receives input of a signal detected by an encoder (not shown) provided at each joint of the robot 2. The ROM is an example of a non-transitory tangible computer readable storage medium.

Figure 2:
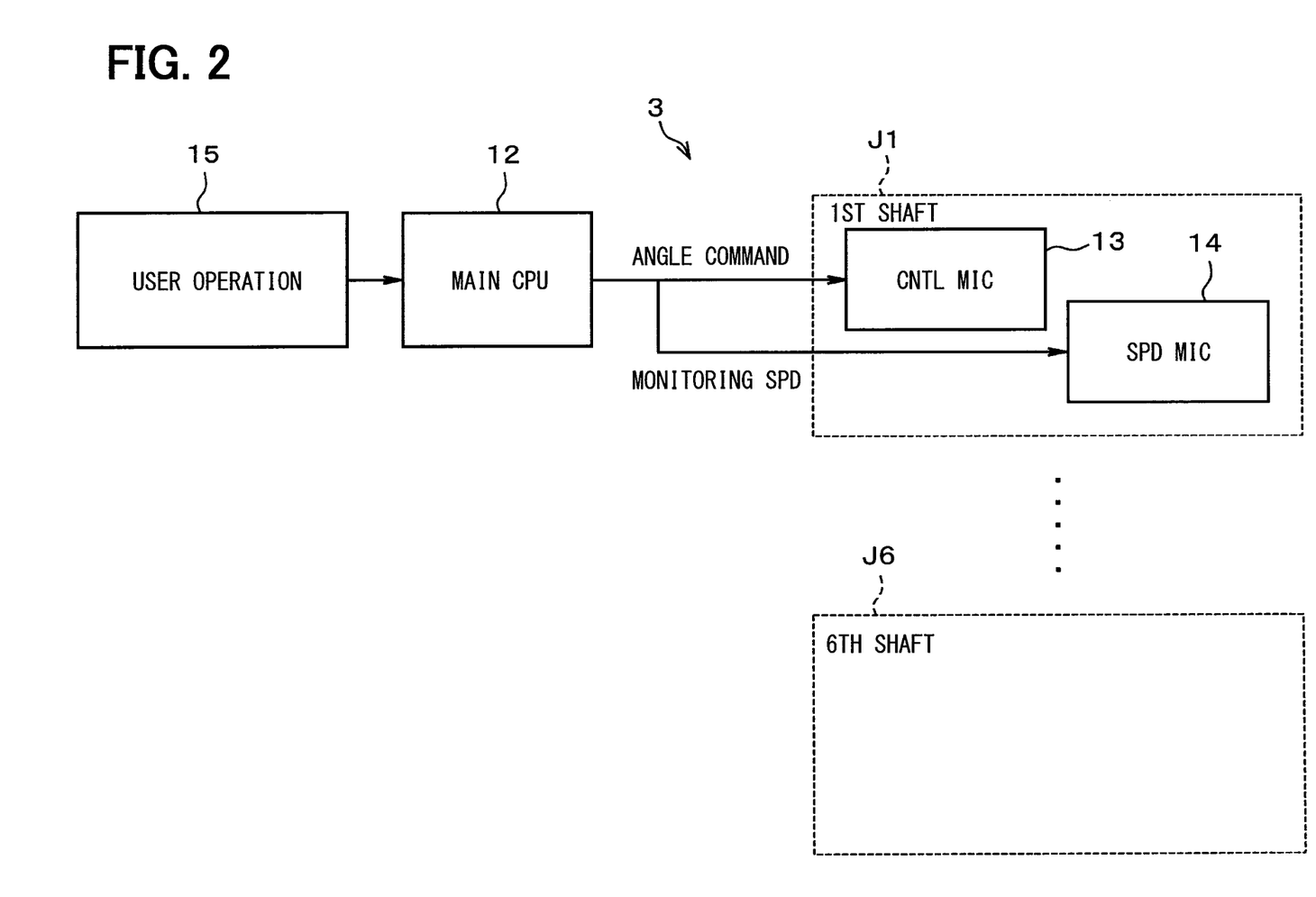
FIG. 2 is a functional block diagram illustrating a part of the controller.
Figure 3:
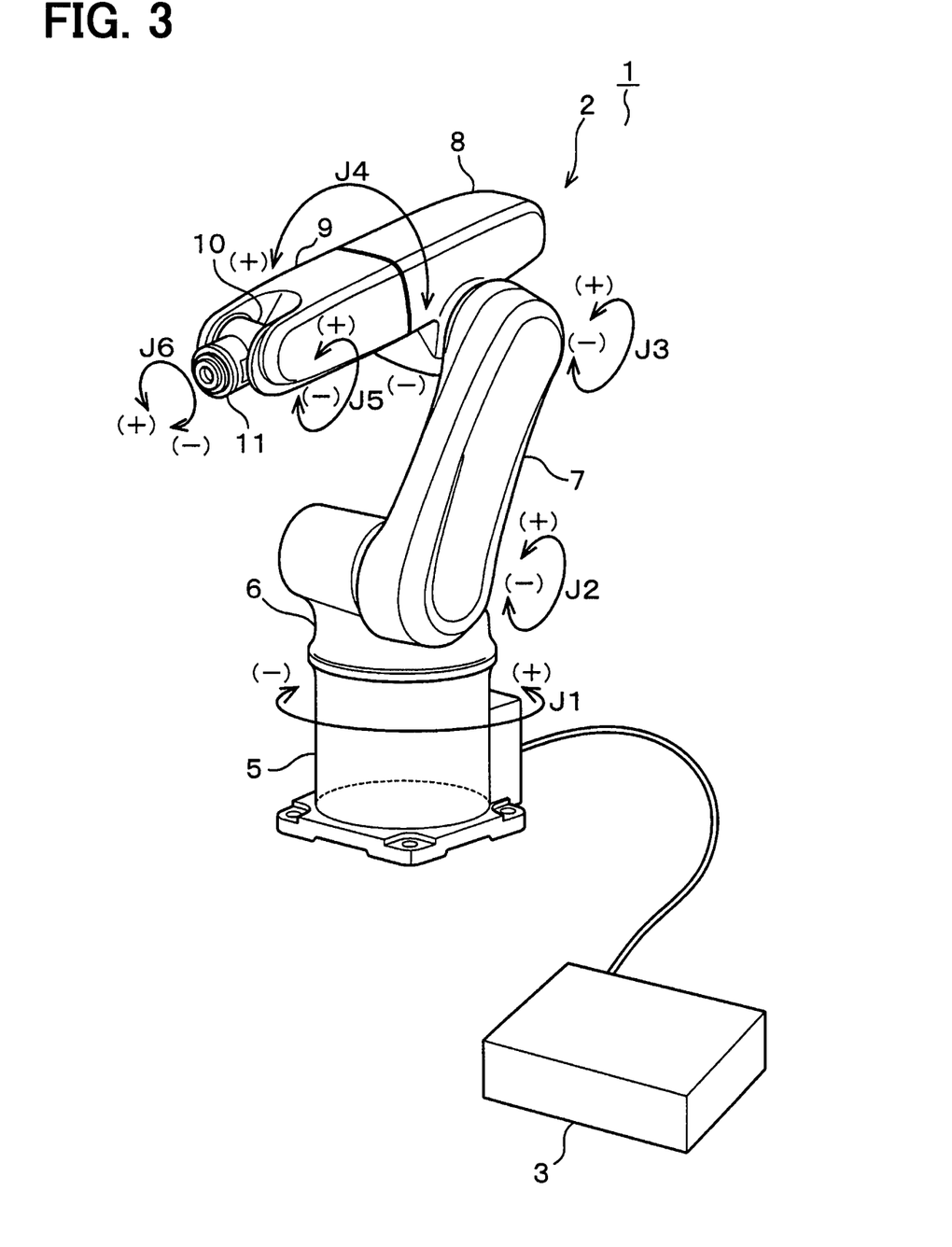
FIG. 3 is a diagram illustrating the configuration of a robot system.

FIG. 2 is a functional block diagram illustrating a part of the controller 3 according to the present embodiment. The controller 3 includes a main CPU 12, a control microcomputer 13, and a speed microcomputer 14. The control microcomputer and the speed microcomputer are provided for each of the axes J1 to J6. A user operation portion 15 such as a teaching pendant (also referred to as TP) is connected to the controller 3. A user sets various parameters for controlling the robot 2 using the user operation portion 15. The main CPU 12 gives an angle command and a monitoring speed to the control microcomputer 13 and the speed microcomputer 14 for each shaft, respectively. The monitoring speed is an upper limit value for monitoring the rotational speed of each shaft.

Figure 1:
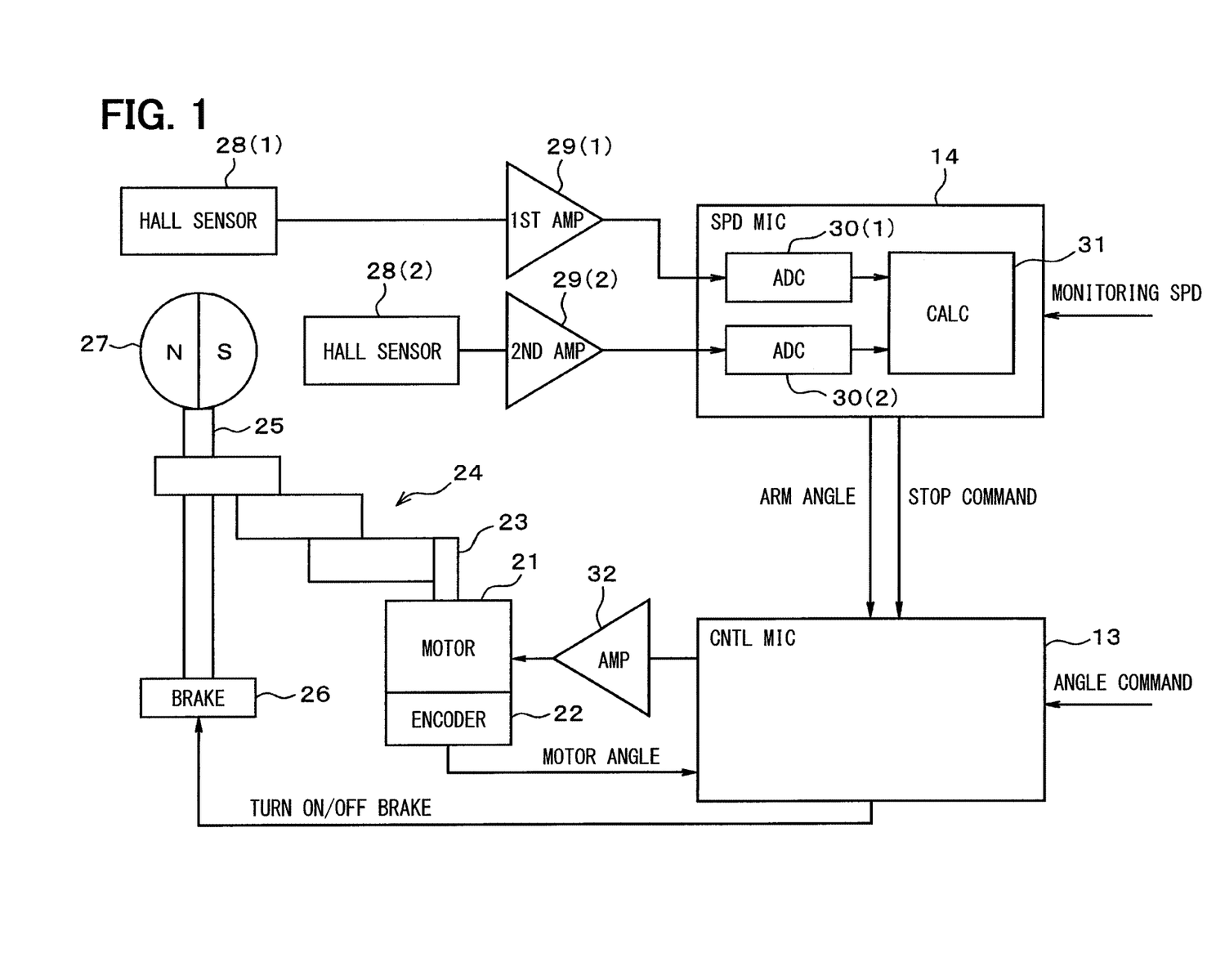
FIG. 1 is a diagram of an embodiment illustrating a model of the configuration around each shaft of a robot and the configuration of a control portion of a controller related to the configuration around each shaft of the robot.

FIG. 1 illustrates a model of the configuration around each shaft of the robot 2 and the configuration of a control portion of the controller 3 related to the configuration around each shaft of the robot. The configuration around the shaft is basically the same as the image illustrated in FIG. 8 so that the same reference numerals as those in FIG. 1 are assigned in FIG. 8. A motor encoder 22 is attached to a motor 21. The encoder 22 inputs a rotational angle of the motor 21 to the control microcomputer 13. A rotational shaft 23 of the motor 21 is connected to an input side of a speed reduction mechanism 24 which is a module including multiple gear positions. An output side of the speed reduction mechanism 24 is connected to a rotational shaft 25 of a corresponding robot arm.

A mechanical brake 26 for controlling the movement of the arm is disposed to the rotational shaft 25. A permanent magnet 27 is also attached to the rotational shaft 25, and a change in the magnetic field of the permanent magnet 27 caused by the rotation of the rotational shaft 25 is detected by two Hall sensors 28 (1) and 28 (2). The Hall sensors 28 (1) and 28 (2) output rotational position signals, or sensor signals, with a phase difference of 90 degrees.

The sensor signals output from the Hall sensors 28 (1) and 28 (2) are amplified by corresponding amplifiers 29 (1) and 29 (2) and are input to corresponding ND converters 30 (1) and 30 (2) of the speed microcomputer 14. Data subjected to ND conversion by the ND converters 30 (1) and 30 (2) is input to an angle and speed calculator 31.

The calculator 31 calculates a rotational angle and a rotational speed of the rotational shaft 25 on the basis of the data on the two-phase sensor signals being input. The calculated rotational angle, that is, an arm angle, is input to the control microcomputer 13. The rotational speed calculated is compared with the monitoring speed given by the main CPU 12 in the calculator 31. When the rotational speed of the arm exceeds the monitoring speed, the speed microcomputer 14 outputs a stop command to the control microcomputer 13.

The control microcomputer 13 controls the motor 21 such that the arm angle to be controlled matches the angle command given by the main CPU 12. A control signal for the motor 21 is given to the motor 21 via an amplifier 32 and the motor driver. The control microcomputer 13 also controls turning on and off of the brake 26. When the stop command is input from the speed microcomputer 14, the control microcomputer 13 turns on the brake 26 and stops driving control of the motor 21. The control microcomputer 13 also performs multi-rotation detection processing for detecting how many times the motor 21 is rotated by referring to the arm angle.

Figure 4:
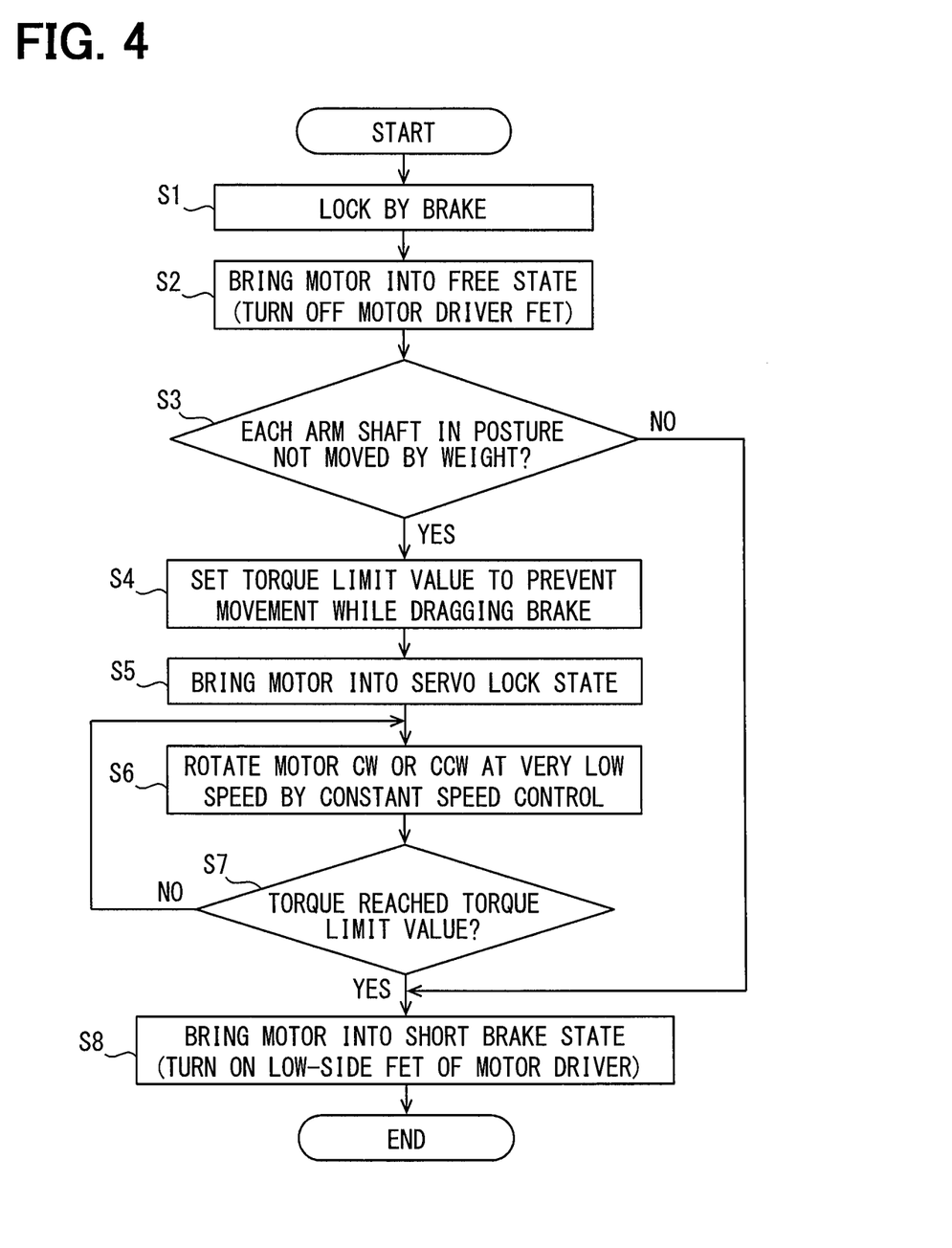
FIG. 4 is a flowchart illustrating processing performed by a control microcomputer to eliminate backlash of a speed reduction mechanism.

Next, the action of the present embodiment will be described with reference to FIGS. 4 to 7. FIG. 4 illustrates processing performed by the control microcomputer 13 to eliminate backlash of the speed reduction mechanism 24. First, the rotational shaft 25 is locked by the brake 26 (S1). Next, all switching elements such as FETs making up the motor driver are turned off to bring the motor 21 into a free state (S2). It is then determined whether or not each arm shaft is in a posture to be not moved by the action of gravity (S3).

Here, if the robot 2 is in a posture allowing gravity to act on the rotational shaft 25 of the arm (NO), backlash is eliminated at the time of S2. Thus, in this case, only a low-side FET of the motor driver is turned on to bring the motor 21 into a short brake state (S8) and end the processing.

On the other hand, backlash is not eliminated if the arm of the robot 2 is in a posture to be aligned with the direction of gravity, for example (YES in S3). A torque limit value is set to maintain the brake locked state (S4), and then the motor 21 is brought into a servo lock state (S5). Then, the motor 21 is rotated clockwise or counterclockwise at a very low speed by constant speed control (S6). This processing is continued until the output torque of the motor 21 reaches the limit value (NO in S7), and when the torque reaches the limit value (YES in S7), the processing proceeds to S8.

The output torque may be estimated by detecting a current applied to the motor 21 or treating the value of a q-axis current as torque when vector control is performed. Backlash is eliminated by such processing. After that, the locked state achieved by the brake 26 is canceled when drive control on the arm is started.

Figure 5:
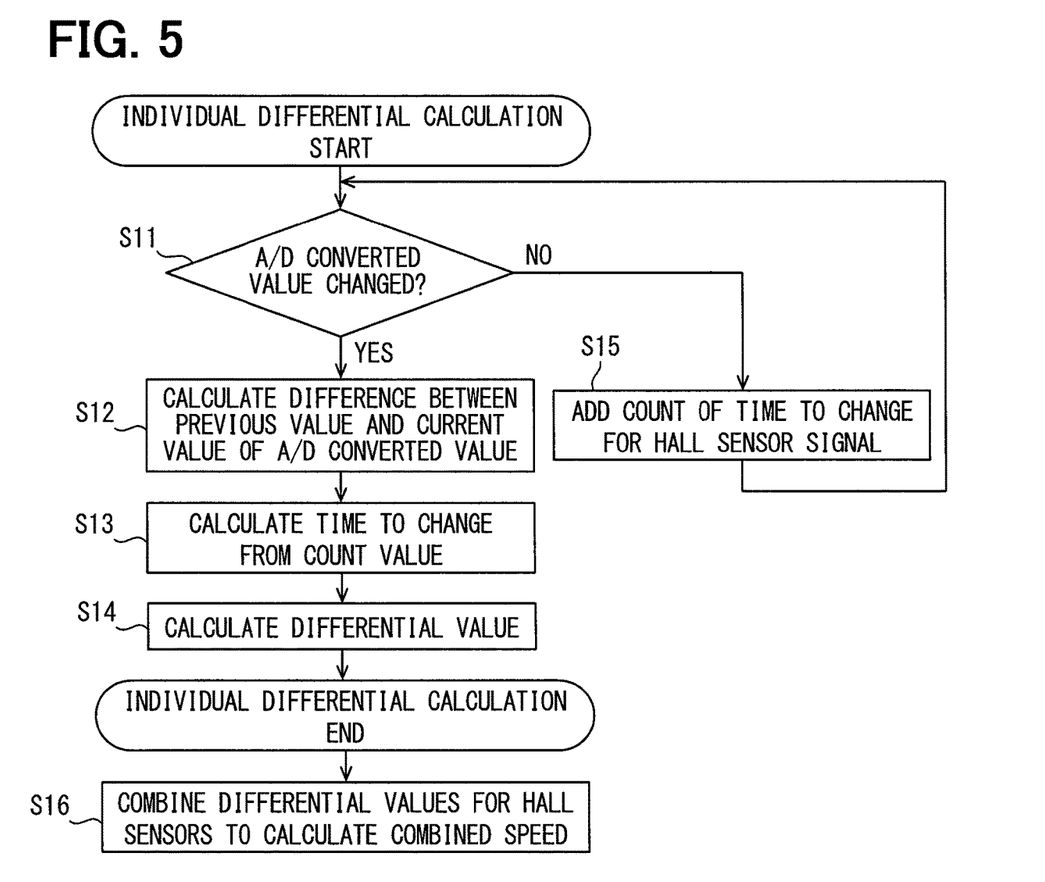
FIG. 5 is a flowchart illustrating processing performed by a speed microcomputer to obtain speed of a rotational shaft.

FIG. 5 illustrates processing performed by the speed microcomputer 14 to obtain the rotational speed of the rotational shaft 25. The processing of S11 to S15 is executed concurrently for the Hall sensors 28 (1) and 28 (2). The speed calculator 31 determines whether or not the converted value output by the A/D converter 30 is changed (S11). If the converted value is not changed (NO), a counter for counting the time to change is incremented (S15), and the processing returns to S11.

If the A/D converted value is changed (YES in S11), a difference between a previous value and a current value of the converted value is calculated (S12), and the time required for the converted value to change is obtained from a count value of the counter (S13). A differential value is then calculated by dividing the difference by the time to change (S14). The speed calculator 31 functions as first and second differentiators.

Once the differential values of the sensor signals output from the Hall sensors 28 (1) and 28 (2) are obtained as described above, the differential values are combined to obtain the speed of the rotational shaft 25 (S16). That is, assuming that the differential values are differential values (1) and (2), the speed is calculated as follows:

(Combined speed)=√{differential value (1)$^2$+differential value (2)$^2$}.

The speed microcomputer 14 compares the speed obtained by the above equation with the monitoring speed and, when the speed exceeds the monitoring speed, outputs the stop command to the control microcomputer 13 as described above. The control microcomputer 13 then turns on the brake 26 and stops driving control of the motor 21. When monitoring the speed in this manner, the speed microcomputer may monitor not a combined speed V itself but a square value V$^2$ thereof.

That is, for example, the processing assumes that two-phase sensor signals H1 and H2 output by the Hall sensors 28 (1) and 28 (2) are sin(ωt) and cos(ωt), respectively. Differentiation of these values gives speeds V1 and V2, respectively.

$V1=dH1/dt=V1=\omega \times \cos(\omega t)$ $V2=dH2/dt=V2=-\omega \times \sin(\omega t)$ The speed V obtained in S16 is as follows:

$V=\sqrt{\{V1^2+V2^2\}}$.

Figure 6:
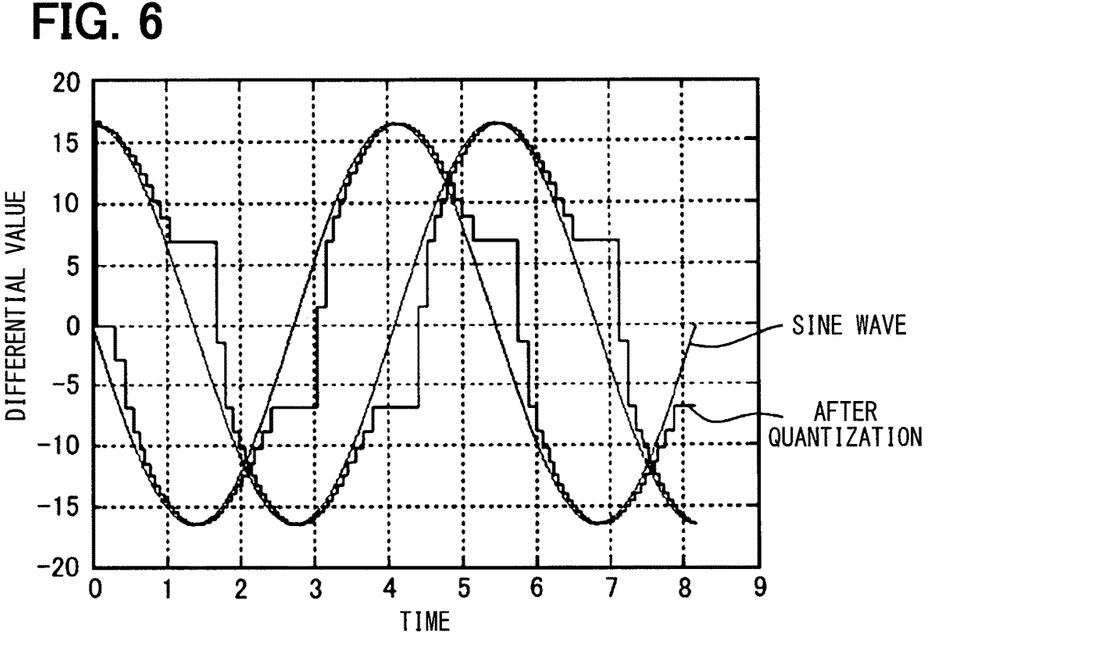
FIG. 6 is a graph illustrating differential values of Hall sensor signals.
Figure 7:
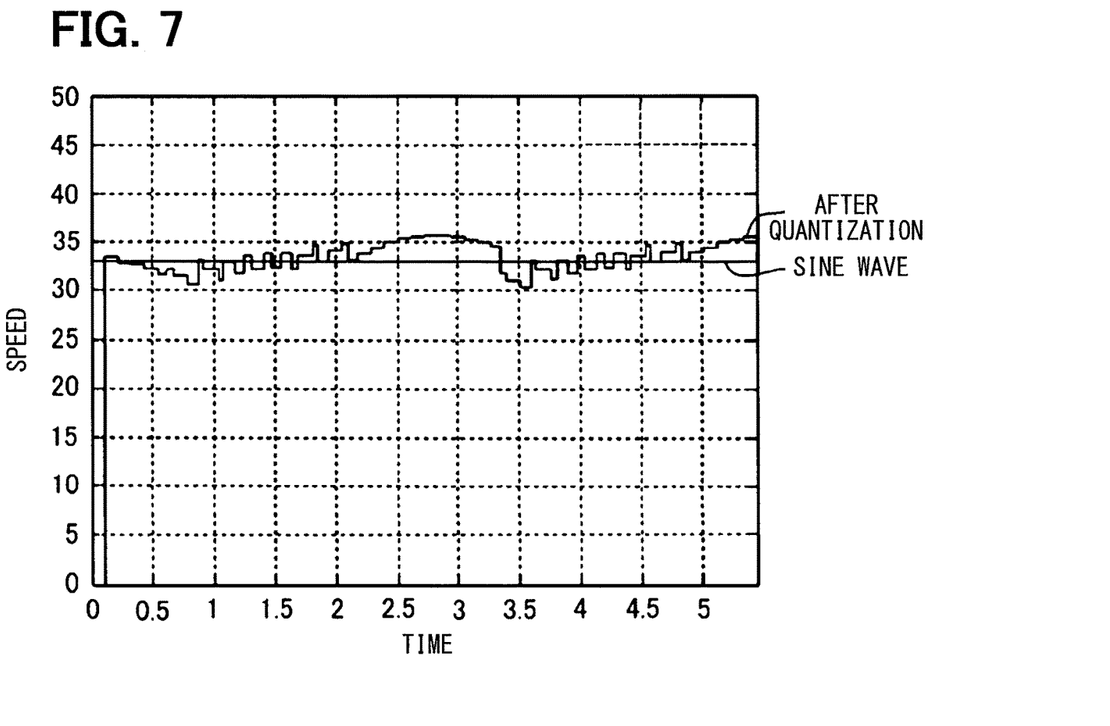
FIG. 7 is a graph illustrating speed obtained by combining two differential values.

The differential values of the signals output by the Hall sensors 28 (1) and 28 (2) are as illustrated in FIG. 6, and the speed V obtained by combining the differential values is as illustrated in FIG. 7. The accuracy of the speed is improved by about 30 times compared to the speed obtained by differentiating the angle θ that is obtained from the sensor signal as illustrated in FIG. 12, the speeds being compared on the range between the maximum and the minimum of variations in speed.

According to the present embodiment described above, the Hall sensors 28 (1) and 28 (2) are disposed to output the sensor signals with the phase difference of 90 degrees on the side of the rotational shaft 25 of the robot arm. The speed calculator 31 of the speed microcomputer 14 differentiates the sensor signals, calculates the sum of squares of the differential signals, and obtains the rotational speed V of the arm. As a result, even the Hall sensors 28 having low resolution and low cost can obtain the rotational speed V with higher accuracy than when obtaining the speed by obtaining the angle from the sensor signals output from the Hall sensors.

The control microcomputer 13 locks the rotational shaft 25 using the brake 26 and sets the torque limit value that falls below the locking force by the brake 26 for the driving torque of the motor 21. The motor 21 is then rotated until the driving torque of the motor 21 reaches the torque limit value to eliminate backlash.

That is, when the motor 21 is rotated with the rotational shaft 25 locked, the motor 21 is rotated by the amount corresponding to backlash and stopped at the time when the gap disappears. The driving torque of the motor 21 increases. It can thus be determined that the gap corresponding to backlash has disappeared at the time when the driving torque reaches the torque limit value, so that backlash can be eliminated to increase the control accuracy of the motor 21.

At this time, the control microcomputer 13 locks the rotational shaft 25 using the brake 26, stops driving of the motor 21 by the motor driver, and determines whether or not the robot arm is in a posture allowing gravity to act on the rotational shaft. If the robot arm is not in the posture allowing gravity to act on the rotational shaft, the control microcomputer performs processing for eliminating backlash.

In general, the robot arm is often stopped in the posture allowing gravity to act on the rotational shaft. In that case, the motor 21 is brought into a state of free rotation by stopping the drive of the motor 21 while the rotational shaft on the side of the arm is locked, so that the rotational shaft 25 is rotated in the direction of gravity and stopped. Backlash is eliminated as a result. The processing for eliminating backlash is performed only in the case of a special posture not allowing gravity to act on the rotational shaft 25, so that the processing can be completed in a short time.

The control microcomputer 13 further performs the multi-rotation detection processing that determines the number of rotations of the rotational shat 22 of the motor 21 by referring to the sensor signals obtained from the Hall sensors 28. In such processing, the number of rotations can be detected with high accuracy by eliminating backlash beforehand.

According to one aspect of the present disclosure, an apparatus for detecting speed of a rotational shaft of a robot arm is applied to a drive mechanism for a robot arm that is driven via a speed reduction mechanism, and first and second rotation sensors are disposed on a side of a rotational shaft of the arm and output rotational position signals with a phase difference of 90 degrees. First and second differentiators differentiate first and second rotational position signals output from the first and second rotation sensors, respectively. A speed calculator obtains a rotational speed of the arm by calculating a sum of squares of first and second differential signals output from the first and second differentiators.

In other words, An speed control apparatus of a rotational shaft includes: a rotational shaft of a robot arm that is driven by a motor via a reduction mechanism; two rotational sensors that are opposed to the rotational shaft, and respectively output rotational position signals which have a phase difference of 90 degrees; and a microcomputer that is configured to differentiate the rotational position signals received from the two rotational sensors to obtain a first differential signal and a second differential signal; square the first differential signal and the second differential signal; and add a square of the first differential signal and a square of the second differential signal to obtain a square-sum result. The microcomputer determines whether a rotational speed of the robot arm exceeds a predetermined speed on a basis of the square-sum result. In response to that it is determined that the rotational speed of the robot arm exceeds the predetermined speed, the microcomputer outputs a stop command to another microcomputer.

Even when the rotational position signals obtained from the two rotation sensors have low resolution to give an approximate rotational position of the shaft, the variation of signals obtained by differentiating the rotational position signals is smaller than the variation indicated by an immediate value of the rotational position. As a result, even the rotation sensors having low resolution can obtain the rotational speed with higher accuracy than when obtaining the speed by obtaining the rotational position from the rotational position signals output from the rotation sensors.

Alternatively, in the speed detection apparatus of a rotational shaft in a robot art, a permanent magnet may be disposed on the rotational shaft of the arm, and the first and second rotation sensors may be magnetic sensors that detect a magnetic change of the permanent magnet.

According to another aspect of the present disclosure, the first and second rotation sensors in the speed detection apparatus of a rotational shaft in a robot arm may be magnetic sensors that detect a magnetic change of a permanent magnet disposed on the rotational shaft of the arm. With such a configuration, the speed of the rotational shaft of the robot arm can be detected by using two inexpensive magnetic sensors.

The present disclosure is not limited to the embodiment described above or illustrated in the drawings, but can be modified or extended as follows.

The processing of S2 and S3 may be omitted.

The rotation sensor is not limited to a magnetic sensor.

The present disclosure may be applied to a robot other than the six-axis vertical robot.

Controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Further alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes multiple steps (also referred to as sections), each of which is represented, for instance, as S1. Further, each step can be divided into several sub-steps while several steps can be combined into a single step.

While the embodiments, the configurations, the aspects of a speed detection apparatus of rotational shaft in robot arm have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A speed detection apparatus of a rotational shaft in a robot arm that is applied to a drive mechanism including a motor, a speed reduction mechanism connected to a rotational shaft of the motor, and a rotational shaft of the robot arm driven via the speed reduction mechanism, the speed detection apparatus comprising:
   a first rotation sensor that is disposed on a side of the rotational shaft of the robot arm and outputs a first rotational position signal;
   a second rotation sensor that is disposed on the side of the rotational shaft of the robot arm and outputs a second rotational position signal with a phase difference of 90 degrees with respect to the first rotational position signal by the first rotation sensor;
   a first differentiator that differentiates the first rotational position signal output from the first rotation sensor;
   a second differentiator that differentiates the second rotational position signal output from the second rotation sensor; and
   a speed calculator that obtains a rotational speed of the robot arm by calculating a sum of squares of a first differential signal output from the first differentiator and a second differential signal output from the second differentiator.

2. The speed detection apparatus of the rotational shaft in the robot arm according to claim 1, wherein:
   the rotational shaft of the robot arm includes a permanent magnet;
   the first rotation sensor is a magnetic sensor that detects a magnetic change of the permanent magnet; and
   the second rotation sensor is a magnetic sensor that detects the magnetic change of the permanent magnet.

3. A speed detection apparatus of a rotational shaft comprising:
   the rotational shaft of a robot arm that is driven by a motor via a reduction mechanism;
   two rotational sensors that are opposed to the rotational shaft, and respectively output rotational position signals which have a phase difference of 90 degrees; and
   a microcomputer that is configured to
   differentiate the rotational position signals received from the two rotational sensors to obtain a first differential signal and a second differential signal;
   square the first differential signal and the second differential signal; and
   add a square of the first differential signal and a square of the second differential signal to obtain a square-sum result,
   wherein:
   the microcomputer determines whether a rotational speed of the robot arm exceeds a predetermined speed on a basis of the square-sum result; and
   in response to that it is determined that the rotational speed of the robot arm exceeds the predetermined speed, the microcomputer outputs a stop command to another microcomputer.

4. The speed detection apparatus of the rotational shaft according to claim 3, wherein:
   the motor includes a rotational shaft that is separate from the rotational shaft of the robot arm; and
   the reduction mechanism is operatively between the rotational shaft of the motor and the rotational shaft of the robot arm.

5. The speed detection apparatus of the rotational shaft according to claim 4, wherein the microcomputer is configured to:
   determine, when the rotational shaft of the robot arm is stopped, whether the rotational shaft of the robot arm will move by force of gravity if a stopping force is removed, and
   if the rotational shaft of the robot arm will not move by the force of gravity, causing the motor shaft to rotate at a low speed to eliminate backlash.

* * * * *